United States Patent
Page

[19]

[11] Patent Number: 5,825,110
[45] Date of Patent: Oct. 20, 1998

[54] BRACKET SUPPORT WITH FLOATING BEARING FOR FRACTIONAL HORSEPOWER MOTOR

[75] Inventor: Alan Page, Monticello, Ind.

[73] Assignee: A. O. Smith Corporation, Milwaukee, Wis.

[21] Appl. No.: 712,912

[22] Filed: Sep. 12, 1996

[51] Int. Cl.$^6$ .............................. H02K 5/16; F16C 23/04
[52] U.S. Cl. ............................................. 310/90; 384/204
[58] Field of Search ........................ 310/90, 91; 384/203, 384/204, 206, 208

[56] References Cited

U.S. PATENT DOCUMENTS

| | | | |
|---|---|---|---|
| 3,795,493 | 3/1974 | Mertl | 29/182.5 |
| 3,969,043 | 7/1976 | Bright et al. | 310/54 |
| 3,982,146 | 9/1976 | Hokky | 310/89 |
| 4,823,032 | 4/1989 | Ward et al. | 310/43 |

*Primary Examiner*—Clayton E. LaBalle
*Attorney, Agent, or Firm*—Michael Best & Friedrich

[57] ABSTRACT

An electrical motor has bearing support structures which self adjust to axially align bearings. The bearings may tip—but not rotate—within supporting sockets so that the bearings may self align to accommodate a shaft passing through them. The bearings are somewhat barrel shaped to fit into somewhat spherical shaped sockets on plastic bridges. The bearings have longitudinal grooves and the sockets have tabs that fit into the grooves to restrain bearing rotation while allowing a tipping which produces the self alignment.

8 Claims, 4 Drawing Sheets

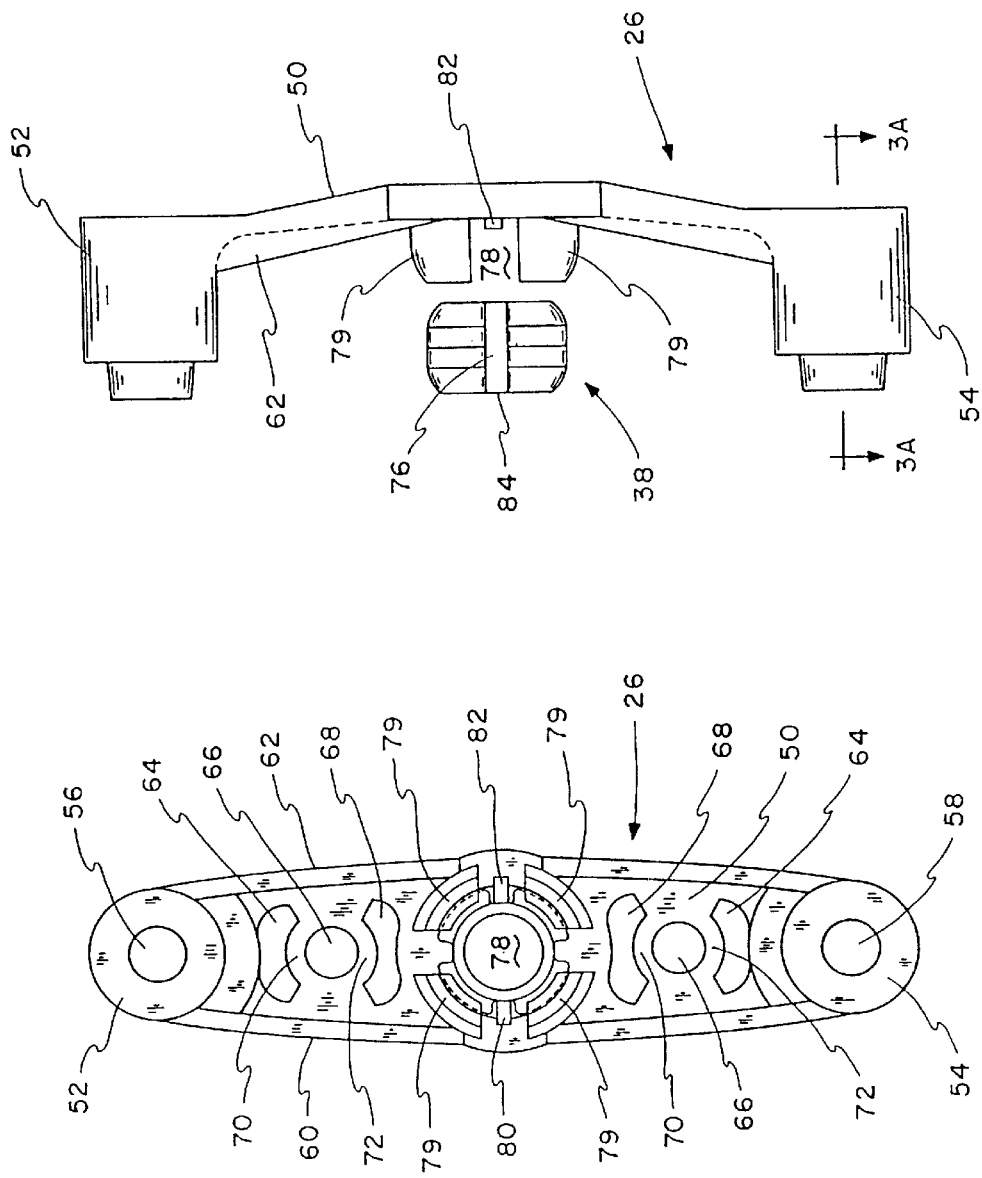
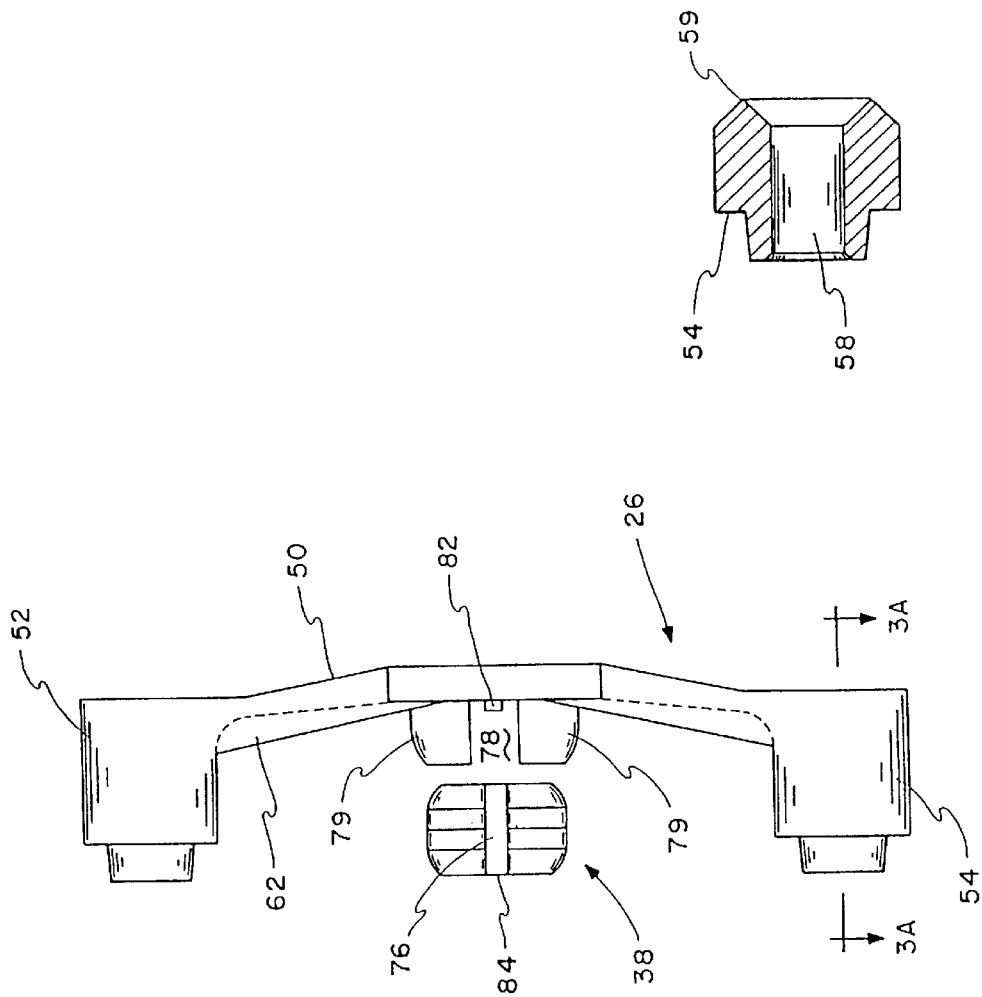

BRACKET SUPPORT WITH FLOATING BEARING FOR FRACTIONAL HORSEPOWER MOTOR

This invention relates to bearing brackets for fractional or sub-fractional horsepower motors and more particularly to brackets with self aligning floating bearings for use in such motors.

Fractional and sub-fractional horsepower motors are well known devices which find use in many environments ranging from mechanized games through sophisticated machines such as clocks, laboratory instruments, and the like. One characteristic of such motors is that they have reached a stage of development where low cost production is essential. Therefore, almost any savings of production cost is a large step forward. Still, since these motors are often used in high quality structures, no reduction in cost can be tolerated if it results in a reduction of quality. Quite the contrary, any change in production should lead to a higher quality motor.

One source of potential trouble in fractional horsepower motors relates to the alignment of bearing which support a rotating shaft. If the bearings are held rigidly, even the slightest misalignment causes severe wear upon a shaft if not an inoperativeness of an entire motor. Heretofore, fractional and sub-fractional horsepower motors have avoided these misalignment problems by using floating self aligning bearings. These floating bearings have required a number of parts, primarily springs, for holding a bearing in a socket while allowing it to rotate enough to align itself with a shaft. Therefore, even if the manufacturing tolerances accumulate into serious misalignment problems, by using floating bearings, the shaft bearing is free to align itself to accommodate and over come that which would otherwise be a defect.

Accordingly, an object of the invention is to provide new and improved fractional and sub-fractional horsepower motors having floating bearings and the support therefor. Here, an object is to reduce the cost and to improve the performance of such motors which rely upon floating bearings.

In keeping with an aspect of the invention, a molded plastic bearing support has a socket containing a plurality of anti-rotation index tabs. The bearing itself is more or less barrel shaped with a central bore for receiving and supporting a motor shaft. The barrel shape is designed to rotatably fit into the socket while being free to seek and maintain a position of the bore in an alignment with the turning shaft. The barrel shape has external longitudinal recesses which receive and fit over the index tabs molded into the socket. This way the barrel is free to tip as may be required to align with a shaft while being held against rotational forces which occur as a result of the shaft rotation.

A preferred embodiment which meets these requirements is shown in the attached drawing in which:

FIG. 2 is a plan view of the inventive bearing support which may be used on this motor of FIGS. 1, 1A;

FIG. 3 is a side elevation of the support of FIG. 2 and of a bearing therefor;

FIG. 3A is a cross section taken along line 3A—3A of FIG. 3;

Figure 1:
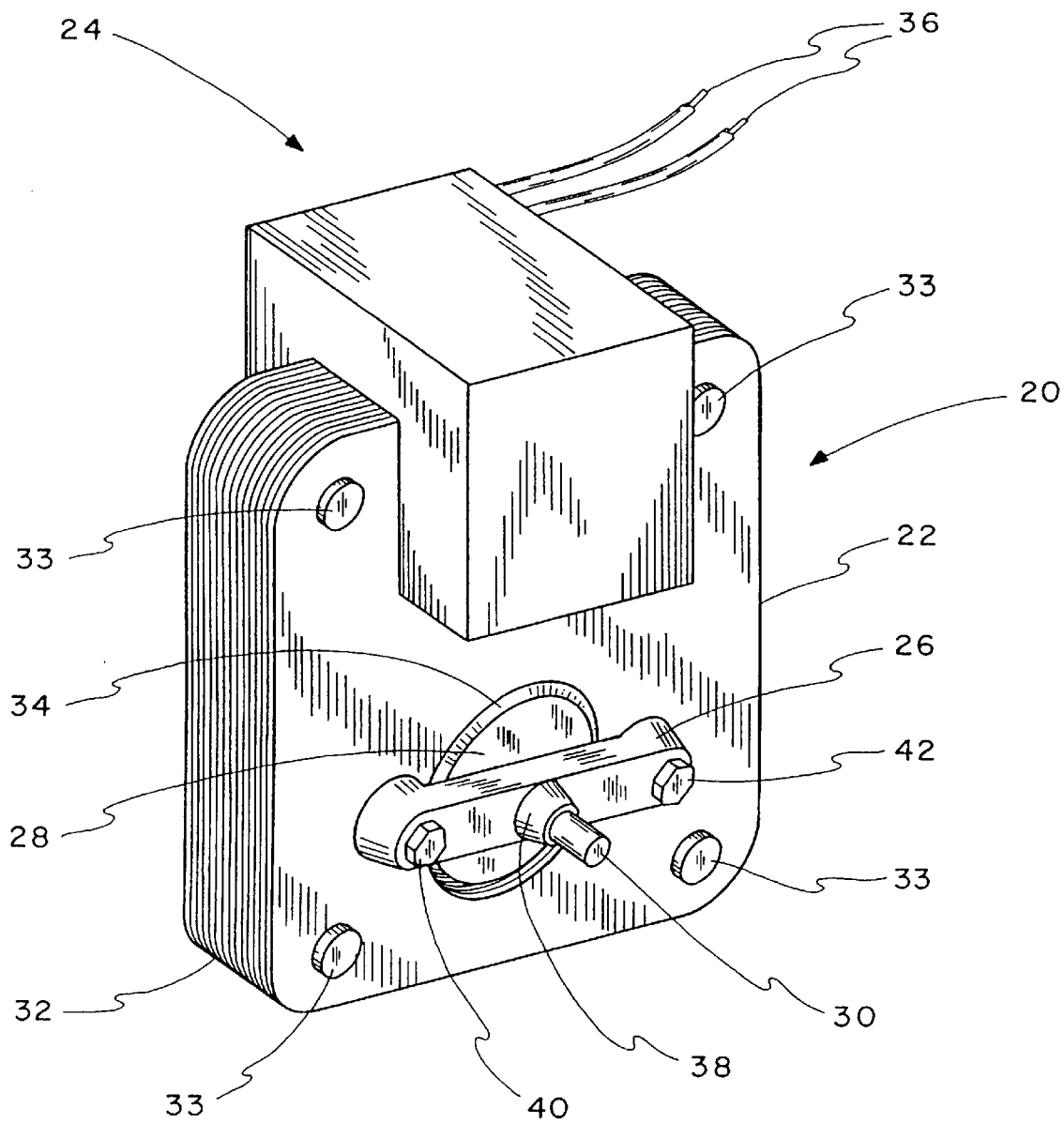
FIG. 1 is a perspective view of a fractional horsepower motor of a type which may use the inventive floating bearing support.

A fractional or sub-fractional horsepower motor 20 is shown in FIG. 1. The major components of the motor include a stator in the form of laminated core 22, a coil 24, a bearing bracket 26, and a rotor 28 mounted on a turning shaft 30 carried by a bearing 38 in the bracket. The core laminations are secured together by rivets 33 and have window 34 for receiving rotor 28. The coil 24 is connected to any suitable power source via wires 36.

Figure 1B:
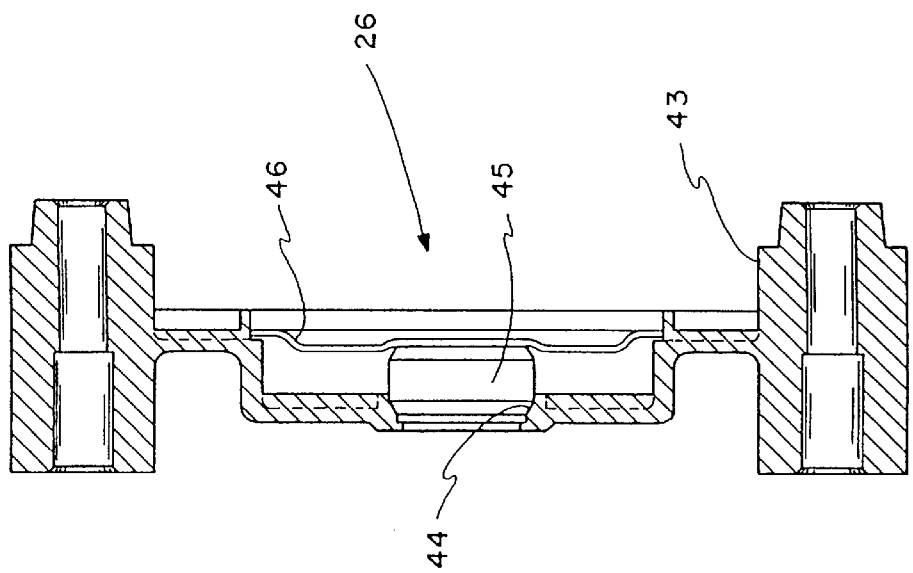
FIG. 1B is a cross section of a prior art floating bearing which might have been used on the motor of FIGS. 1, 1A.
Figure 1A:
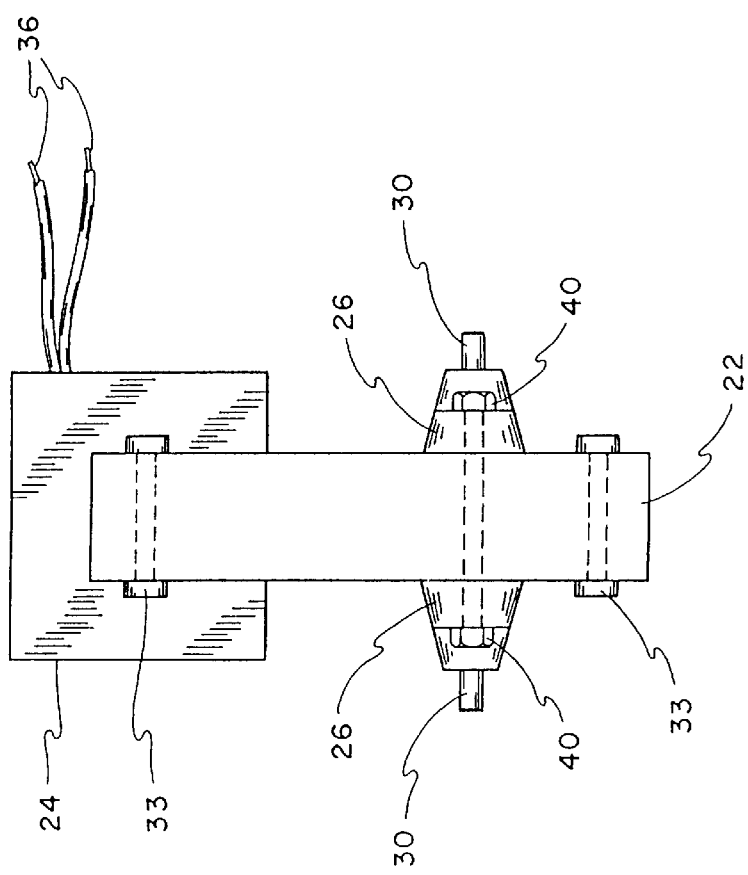
FIG. 1A is a side elevation of the motor of FIG. 1.
Figure 7:
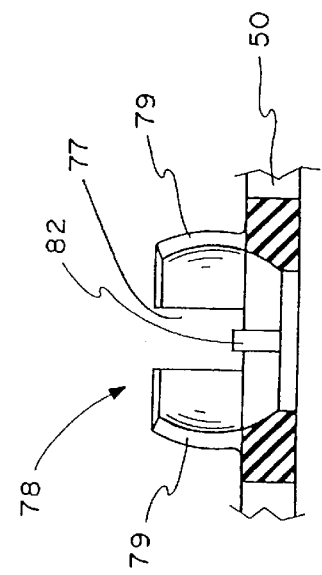
FIG. 7 is a cross-section of a socket for receiving and supporting the bearing of FIGS. 4—6.

FIG. 1A is a side elevation of the motor of FIG. 1 showing the bearing supports 26, 26 on opposite sides of the laminated core structure 22. The rotor 28 is mounted on shaft 30 which extends through and is supported by the bearings 38 on opposite sides of the motor. The invention is directed to bearing 38 and to bearing bracket 26.

The laminants are metal parts formed by a punch press and therefore, are made with the accuracy of a die. The inventive bearing brackets 26 are molded and, therefore, are made with the accuracy of a mold cavity. Accordingly, the piece parts dimensions are very accurate. Nevertheless, all parts have manufacturing tolerances. For example, the bearing brackets are held in place by bolts 40, 42 which pass through the front bracket 26, holes through the core laminates, and the back bracket 26, as seen in FIG. 1A. This means that the holes must be large enough for easy insertion of the bolts 40, 42. Likewise all of the other piecepearts have similar tolerance variations. Most of these tolerance variations average out so that usually the bearings 38 are well aligned. However, sometimes the tolerances of all parts in a motor may not average so that the cumulative tolerance variations provide a substantial departure from normal so that bearings 38 are misaligned.

FIG. 1B shows a prior art way of accommodating the bearings so that they may align themselves. Here the bearing support bracket 43 is usually a cast metal part, perhaps made of zinc or the like. The bracket 43 has a somewhat dish shaped seat 44 for supporting one side of bearing 45. A spring 46 snaps over, captures, and supports the opposite side of the bearing 45, thereby leaving the bearing free to float so that it may move to align itself with the turning shaft 30 (FIG. 1). The prior art structure of FIG. 1B is more expensive than it has to be because the separate spring 46 has a cost and because it requires separate assembly steps. Also, as good as the bearing and support of Fig. 1B may be, it is thought that an improved performance can be had by the inventive structure.

Within reason, the invention provides means for accommodating any bearing misalignments that may occur without requiring separate parts; such as a spring, or complicated assembly procedures. In greater detail, FIGS. 2 and 3 show the inventive bearing bracket bearing 26 as an elongated, preferably molded plastic bracket 26. While different materials may be used to form bracket 26, the preferred material is nylon 6/6 which is 30% glass filled. The structural shape of bracket 26 is a bridge 50 supported at its opposite ends by posts 52, 54 which contain and define bolt holes 56, 58 for receiving bolts 40, 42 (FIG. 1). The cross section of posts 52, 54 is shown in FIG. 3A. Preferably, there is a relatively sharp raised circular edge 59 surrounding the bolt hole 58 to reduce friction against the bolt head at the time of an installation of the bearing bracket 26.

Side rails 60, 62 extend between posts 52, 54 to give added vertical strength to the bridge 50. The underside of the bridge is designed to prevent problems which might otherwise occur when plastic is molded. Those problems involve shrinkage, warpage, sunken areas, and the like. Also, it is desirable to reduce the consumption of plastic by blocking out any space in the mold where plastic is not required in order for the molded plastic piecepart to adequately perform its functions. Each end of the bridge part 50 has three open spaces 64, 66, 68 leaving two arches 70, 72. These open spaces serve the twin purposes of eliminating sunken or shrinkage areas and of saving plastic.

At the center of bridge 50, a socket 78 is formed. Preferably, the circumference of the socket 78 is defined by four upstanding leaves 79 which produce a somewhat spherical cavity that will surround and embrace a somewhat barrel shaped bearing 38. Four open spaces 77 appear between the four leaves in order to make it possible to install and remove the bearing 38 with ease merely by inserting a pry.

In each of two oppositely disposed spaces 76 between the socket leaves 79, an upstanding anti-rotation tab 80, 82 is formed. These tabs provide stops which prevent the bearing 38 from rotating within the socket and about an axis extending through the bore 84 (FIG. 6) of the bearing.

Figure 6:
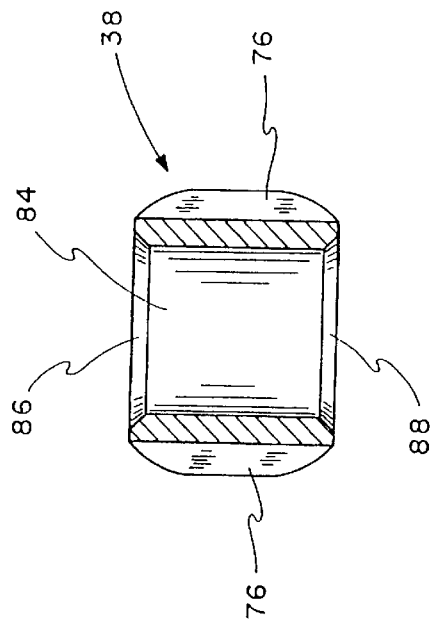
FIG. 6 is a cross-section view of the bearing taken along line 6—6 of FIG. 4.
Figure 4:
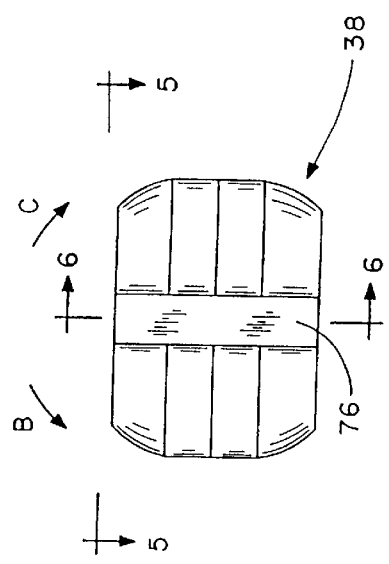
FIG. 4 is a side elevation of the bearing.

The construction of the bearing 38 is seen in FIGS. 3, 4, 6. In greater detail, the bearing 38 is preferably made of a high graphite iron, has all burrs removed, and is free of nicks, or foreign particles. The upper and lower edges of bore 84 are chamfered at 86, 88 (FIG. 6) to form a taper which facilitates an insertion of the shaft 30 and which reduces shaft ware.

Figure 5:
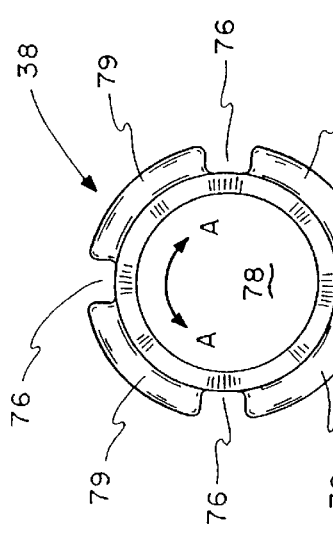
FIG. 5 is a top plan view taken along lines 5—5 of FIG. 4.

In greater detail, as best seen in FIG. 4, the external contour of bearing 38 is somewhat barrel shaped. The plan view of the bearing is seen in FIG. 5 where four longitudinal grooves 76 are formed at equally spaced (90°) intervals around the periphery of the bearing 38. Each longitudinal groove 76 is wide enough to easily receive an anti-rotational tab 80, 82 in the socket 78. These tabs prevent rotation as shown by a double ended arrow A—A in FIG. 5, but do not interfere with bearing 38 rocking in the directions B, C (FIG. 4). Therefore, the bearing is stationary insofar as a rotating shaft is concerned. However, the bearing is also free to rock and align itself with the axis of the shaft regardless of how badly (within reason) the shaft may be axially misaligned.

Those who are skilled in the art will readily perceive how to modify the invention. Therefore, the appended claims are to be construed to cover all equivalent structures which fall within the true scope and spirit of the invention.

I claim:

1. A fractional horsepower motor comprising a magnetic core structure with a rotor mounted on said structure, said rotor having an axial turning shaft, a bearing bracket having a socket and being mounted on said magnetic core structure, a bearing mounted in said socket and carried by said bearing bracket for supporting said shaft, said bearing having a somewhat barrel shaped contour and having at least two longitudinal grooves on a periphery of said barrel shape, said socket having at least four upstanding leaves with at least four vertical slot spaces between and separating said leaves, at least two oppositely disposed ones of said slots containing tabs formed in said socket and fitting into said grooves for restraining bearing rotation about an axis of said bearing while enabling said bearing to tip in said socket in order to compensate for a shaft bearing misalignment, and said vertical slot spaces providing openings for inspecting a fitting of said tabs into said grooves and for installation of a pry for removing said bearing from said socket.

2. The motor of claim 1 wherein said bearing bracket is made of molded glass filled nylon.

3. The motor of claim 2 wherein said bearing is made of high graphite iron.

4. A self-aligning bearing structure for use in an electrical motor having a stator and a rotor with an axle, said bearing structure comprising a somewhat barrel shaped bearing for rotatably supporting said axle of said rotor, at least two opposed grooves formed longitudinally on an outside surface and along the length of said somewhat barrel shape, an elongated bearing bracket having a centrally located socket therein, said socket having upstanding leaves defining a truncated generally spherical cavity for receiving said somewhat barrel shaped bearing, said leaves being separated from each other to provide oppositely disposed spaces between them, at least one pair of said oppositely disposed spaces containing a protruding anti-rotational shape which cooperates with said grooves on said outside surface of said somewhat barrel shape whereby said cooperation between said anti-rotational shape and said grooves maybe confirmed by looking through said one pair of said spaces, said cooperation between said anti-rotational shape and said grooves enabling said somewhat barrel shaped bearing to tip in said spherical socket in order to align itself with said axle of said rotor, and separations between other of said leaves to provide space for a pry to enable a removal of said bearing.

5. The bearing structure of claim 4 wherein there are two brackets for said motor, each of said brackets being a glass filled nylon bridge structure having a length which spans said rotor and is adapted to be mounted at its opposite ends on each of opposite sides of said stator with said socket facing inwardly and opening toward and being aligned with said rotor, one of said somewhat barrel shaped bearings being mounted in each of said sockets whereby said bearings are free to tip into axial alignment responsive to an insertion of a shaft of said rotor in said bearings.

6. The bearing support of claim 5 wherein each of said bearings has an axial bore with opposite edges of said bore being chamfered.

7. The bearing structure of claim 5 wherein said adaptation for mounting at said opposite ends of said bridge comprises a bolt hole formed in each of said opposite ends therein with a generally sharp raised circumferential edge surrounding said bolt hole to provide a minimum friction to a tightening of said bolts for mounting said brackets on said starter.

8. The bearing structure of claim 4 wherein there are four of said upstanding leaves forming said said socket and there are four of said spaces located at approximately 90° intervals around a circumference of said socket said anti-rotational shape comprising at least one tab formed in at least one of said spaces which fits into said groove.

* * * * *